United States Patent
Son et al.

(10) Patent No.: US 10,862,130 B2
(45) Date of Patent: *Dec. 8, 2020

(54) CATHODE FOR LITHIUM-SULFUR BATTERY AND MANUFACTURING METHOD THEREFOR

(71) Applicant: LG CHEM, LTD., Seoul (KR)

(72) Inventors: Byoungkuk Son, Daejeon (KR); Minchul Jang, Daejeon (KR); Min Seo Kim, Daejeon (KR); Da Young Sung, Daejeon (KR); Seong Ho Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 134 days.

This patent is subject to a terminal disclaimer.

(21) Appl. No.: 16/202,946

(22) Filed: Nov. 28, 2018

(65) Prior Publication Data

US 2019/0097239 A1   Mar. 28, 2019

Related U.S. Application Data

(62) Division of application No. 14/908,331, filed as application No. PCT/KR2014/006086 on Jul. 8, 2014, now Pat. No. 10,170,766.

(30) Foreign Application Priority Data

Aug. 1, 2013   (KR) .................. 10-2013-0091784

(51) Int. Cl.
*H01M 4/62* (2006.01)
*H01M 4/13* (2010.01)
(Continued)

(52) U.S. Cl.
CPC .......... *H01M 4/628* (2013.01); *H01M 4/0409* (2013.01); *H01M 4/13* (2013.01);
(Continued)

(58) Field of Classification Search
None
See application file for complete search history.

(56) References Cited

U.S. PATENT DOCUMENTS 6,194,098 B1   2/2001  Ying
2003/0113627 A1   6/2003  Choi et al.
(Continued)

FOREIGN PATENT DOCUMENTS

EP   1 324 409 A2   7/2003
JP   11-97027 A   4/1999
(Continued)

OTHER PUBLICATIONS

Extended European Search Report for Appl. No. 14832794.3 dated Jan. 20, 2017.
(Continued)

*Primary Examiner* — Wojciech Haske
(74) *Attorney, Agent, or Firm* — Birch, Stewart, Kolasch & Birch, LLP

(57) ABSTRACT

The present application relates to a cathode for a lithium-sulfur battery and a method of preparing the same. More specifically, the cathode for a lithium-sulfur battery according to an exemplary embodiment of the present application includes: a cathode active part including a sulfur-carbon composite; and a cathode coating layer including an amphiphilic polymer provided on at least one portion of a surface of the cathode active part and including a hydrophilic portion and a hydrophobic portion.

3 Claims, 3 Drawing Sheets

(51) Int. Cl.
    *H01M 4/38*  (2006.01)
    *H01M 10/052*  (2010.01)
    *H01M 4/04*  (2006.01)
    *H01M 4/40*  (2006.01)
    *H01M 10/0568*  (2010.01)
    *H01M 4/136*  (2010.01)

(52) U.S. Cl.
    CPC ............. *H01M 4/38* (2013.01); *H01M 4/382* (2013.01); *H01M 4/386* (2013.01); *H01M 4/405* (2013.01); *H01M 4/62* (2013.01); *H01M 4/625* (2013.01); *H01M 10/052* (2013.01); *H01M 10/0568* (2013.01); *H01M 4/136* (2013.01); *H01M 2220/20* (2013.01); *H01M 2220/30* (2013.01); *Y02T 10/70* (2013.01)

(56) References Cited

U.S. PATENT DOCUMENTS

| | | |
|---|---|---|
| 2004/0029014 A1 | 2/2004 | Hwang et al. |
| 2004/0101753 A1 | 5/2004 | Hwang |
| 2005/0175903 A1 | 1/2005 | Kim |
| 2010/0119947 A1 | 5/2010 | Lee et al. |
| 2012/0119161 A1 | 5/2012 | Son et al. |
| 2013/0029220 A1 | 1/2013 | Han et al. |
| 2013/0065128 A1 | 3/2013 | Li et al. |
| 2014/0342214 A1 | 11/2014 | Wegner et al. |

FOREIGN PATENT DOCUMENTS

| | | |
|---|---|---|
| JP | 2003-197196 A | 7/2003 |
| JP | 2004-179160 A | 6/2004 |
| KR | 10-2004-0013585 A | 2/2004 |
| KR | 10-2010-0053758 A | 5/2010 |
| KR | 10-2010-0136974 A | 12/2010 |
| KR | 10-2012-0051549 A | 5/2012 |
| KR | 10-2013-0013524 A | 2/2013 |
| WO | WO 2009/114314 A2 | 9/2009 |
| WO | WO 2013/087348 A2 | 6/2013 |

OTHER PUBLICATIONS

International Search Report for Appl. No. PCT/KR2014/006086 dated Oct. 17, 2014 (w/ English translation).

Korean Office Action for Appl. No. 10-2014-0085195 dated Dec. 16, 2015 (w/ English translation).

Korean Office Action for Appl. No. 10-2014-0085195 dated Jun. 15, 2015 (w/ English translation).

Korean Office Action for Appl. No. 10-2016-0045689 dated Jul. 7, 2016 (w/ English translation).

Written Opinion of the International Searching Authority for Appl. No. PCT/KR2014/006086 dated Oct. 17, 2014 (w/ English translation).

[Figure 1]
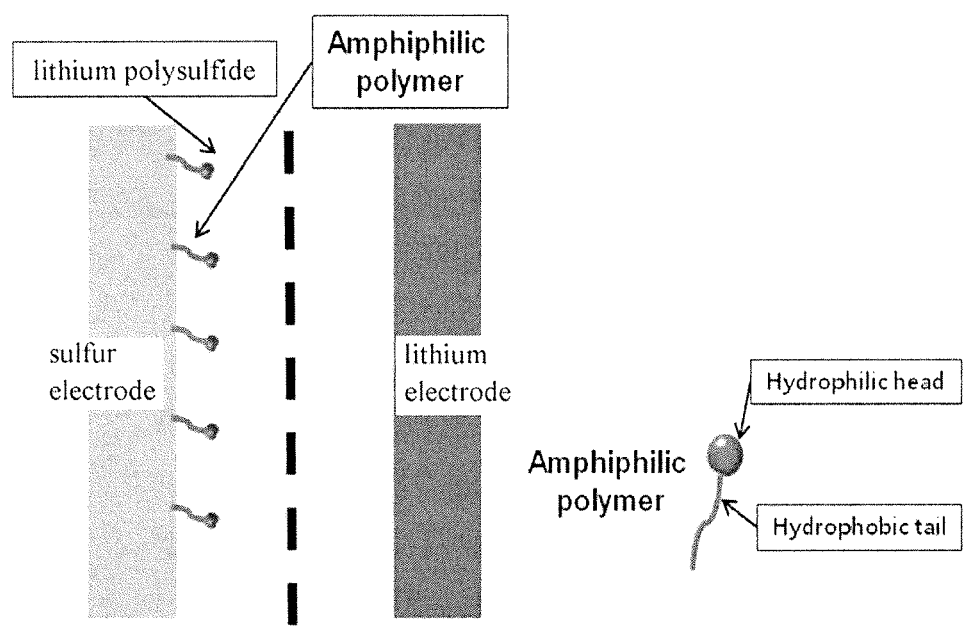

[Figure 2]
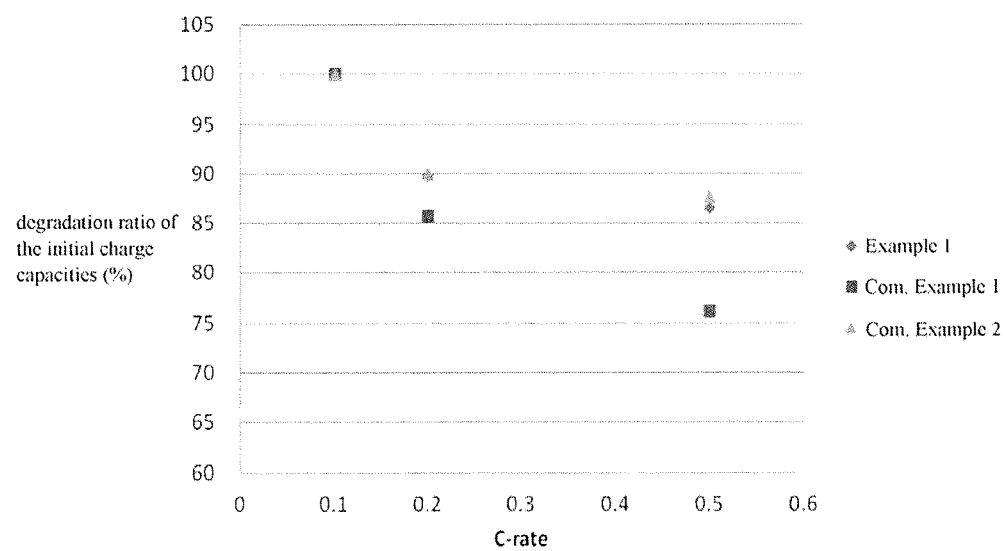

[Figure 3]
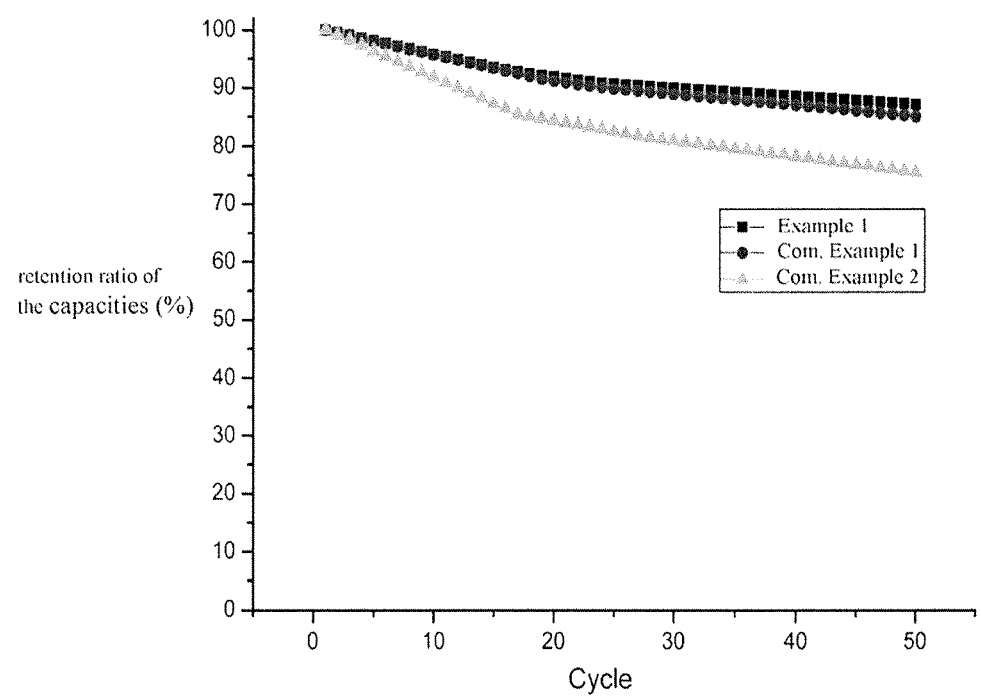

CATHODE FOR LITHIUM-SULFUR BATTERY AND MANUFACTURING METHOD THEREFOR

This application is a Divisional of copending application Ser. No. 14/908,331 filed on Jan. 28, 2016, which is the U.S. National Phase of PCT/KR2014/006086, filed Jul. 8, 2014, and which claims priority under 35 U.S.C. § 119(a) to Application No. 10-2013-0091784 filed in Korea, on Aug. 1, 2013, the entire contents of all of which are expressly incorporated by reference into the present application.

TECHNICAL FIELD

The present application relates to a cathode for a lithium-sulfur battery and a method of preparing the same.

BACKGROUND ART

Up to now, there has been considerable interest in developing high energy density batteries using lithium as an anode. Lithium metal is particularly attractive as an anode active material of an electrochemical battery because of light weight and high energy density of the metal, for example, compared to a lithium-intercalated carbon anode, which increases the weight and volume of the anode to reduce the energy density of a battery due to the presence of non-electroactive materials, and other electrochemical systems having nickel or cadmium electrodes. A lithium metal anode or an anode mainly including lithium metal is lighter than batteries such as lithium-ion, nickel metal hydride or nickel-cadmium batteries, and provides an opportunity to configure a battery having a high energy density. These features are highly desirable for batteries for portable electronic devices such as cellular phones and lap-top computers where a premium is paid for low weight.

These types of cathode active materials for a lithium battery are publicly known, these materials include a sulfur-containing cathode active material including sulfur-sulfur bonds, and high energy capacities and re-chargeability are achieved from the electrochemical cleavage (reduction) and reformation (oxidation) of the sulfur-sulfur bonds.

As described above, the lithium-sulfur batteries using lithium and an alkali metal as an anode active material and sulfur as a cathode active material have a theoretical energy density of 2,800 Wh/kg (1,675 mAh), which is significantly higher than those of other battery systems, and have received attention as portable electronic devices due to an advantage in that sulfur is inexpensive due to the abundance in resources, and an environmentally-friendly material.

However, since sulfur used as a cathode active material of a lithium-sulfur battery is a non-conductor, there are problems in that it is difficult for electrons produced by an electrochemical reaction to move, sulfur leaks into an electrolyte during an oxidation-reduction reaction so that the service life of battery deteriorates, and furthermore, when an appropriate electrolytic solution is not selected, lithium polysulfide, which is a reduced material of sulfur, is eluted so that sulfur may no longer participate in the electrochemical reaction.

Thus, in order to minimize the amount of lithium polysulfide which is dissolved into the electrolytic solution and impart electric conductivity characteristics to a sulfur electrode which is a non-conductor, a technology in which a composite of carbon and sulfur is used as a cathode has been developed, but an elution problem of lithium polysulfide still cannot be solved.

Therefore, there is a high need for a technology to improve cycle characteristics by effectively blocking lithium polysulfide from leaking into the electrolyte during the discharge of a lithium-sulfur battery.

DETAILED DESCRIPTION OF THE INVENTION

Technical Problem

In order to solve the problems, the present application has been made in an effort to provide a technology to improve cycle characteristics by effectively blocking lithium polysulfide from leaking into an electrolyte during the discharge of a lithium-sulfur battery.

Technical Solution

An exemplary embodiment of the present application provides a cathode for a lithium-sulfur battery, including:
a cathode active part including a sulfur-carbon composite; and
a cathode coating layer provided on at least one portion of a surface of the cathode active part and including an amphiphilic polymer including a hydrophilic portion and a hydrophobic portion.

Further, another exemplary embodiment of the present application provides a lithium-sulfur battery including:
an anode including lithium metal or a lithium alloy as an anode active material;
a cathode for the lithium-sulfur battery;
a separator provided between the cathode and the anode; and
an electrolyte impregnated in the anode, the cathode, and the separator and including a lithium salt and an organic solvent.

In addition, still another exemplary embodiment of the present application provides a method of preparing a cathode for a lithium-sulfur battery, the method including:
forming a cathode active part including a sulfur-carbon composite; and
forming a cathode coating layer, which includes an amphiphilic polymer including a hydrophilic portion and a hydrophobic portion, on at least one portion of a surface of the cathode active part.

Advantageous Effects

According to the present application, by providing an outer coating layer, which includes an amphiphilic polymer including a hydrophilic portion and a hydrophobic portion, on at least one portion of a surface of a cathode active part including a sulfur-carbon composite, the amphiphilic polymer may be bonded to lithium polysulfide produced during the discharge, and accordingly, may suppress a phenomenon in which lithium polysulfide is dissolved into an electrolytic solution, thereby improving cycle characteristics of a lithium-sulfur battery.

BRIEF DESCRIPTION OF DRAWINGS

FIG. 1 illustrates that an amphiphilic polymer included in a cathode coating layer of a cathode prevents sulfur of lithium polysulfide eluted during the discharge of a lithium-sulfur battery from being eluted from the cathode, as an exemplary embodiment of the present application.

FIG. 2 is a view illustrating the initial discharge capacities of lithium-sulfur batteries in Example 1 and Comparative Examples 1 and 2, as an exemplary embodiment of the present application.

FIG. 3 is a view illustrating the discharge capacities of lithium-sulfur batteries in Example 1 and Comparative Examples 1 and 2 for each cycle, as an exemplary embodiment of the present application.

BEST MODE

Hereinafter, the present application will be described in more detail.

As a result of intensive studies and repeated various experiments, the inventors of the present application have confirmed that when a cathode coating layer including an amphiphilic polymer including a hydrophilic portion and a hydrophobic portion is formed on at least one portion of a cathode active part including a sulfur-carbon composite, the amphiphilic polymer simultaneously having hydrophilicity and hydrophobicity may improve cycle characteristics of the lithium-sulfur battery by biding sulfur and carbon, and holding lithium polysulfide produced during the discharge, and thus suppressing a phenomenon in which lithium polysulfide is dissolved into the electrolytic solution, thereby completing the present application.

A cathode for a lithium-sulfur battery according to an exemplary embodiment of the present application includes: a cathode active part including a sulfur-carbon composite; and a cathode coating layer including an amphiphilic polymer provided on at least one portion of a surface of the cathode active part and including a hydrophilic portion and a hydrophobic portion.

The amphiphilic polymer is a material simultaneously having a hydrophilic portion and a hydrophobic portion. Examples of the amphiphilic polymer include polyvinyl pyrrolidone (PVP), polyethylene oxide (PEO), polyvinyl alcohol (PVA), a copolymer thereof, and the like, but are not limited thereto.

In a specific example, the amphiphilic polymer may be disposed on at least one portion of the surface of the cathode active part. In addition, the amphiphilic polymer may be disposed over the entire region of the surface of the cathode active part.

Furthermore, the amphiphilic polymer is disposed on the surface of the cathode active part, the hydrophilic portion of the amphiphilic polymer may be oriented towards the sulfur-carbon composite, and the hydrophilic portion thereof may be oriented towards the outside thereof.

In an exemplary embodiment of the present application, the sulfur-carbon composite is formed by applying sulfur particles onto porous carbon.

In an exemplary embodiment of the present application, the sulfur-carbon composite is formed by dissolving sulfur particles and mixing the sulfur particles with carbon.

In an exemplary embodiment of the present application, the content ratio of carbon and sulfur of the sulfur-carbon composite may be 1:20 to 1:1.

The carbon may be crystalline or amorphous carbon, and is not limited as long as the carbon is conductive carbon, and may be, for example, graphite, carbon black, an activated carbon fiber, a non-activated carbon nanofiber, a carbon nanotube, a carbon fabric, and the like.

In an exemplary embodiment of the present application, the cathode coating layer includes pores.

The pores may have an average diameter of 1 nm to 10 μm.

When the pores of the cathode coating layer have an average diameter of 1 nm or more, the area of the cathode coating layer including the amphiphilic polymer is sufficiently large, so that characteristics of attracting lithium polysulfide eluted from the sulfur-carbon composite during the discharge of the lithium-sulfur battery are excellent, and the cycle characteristics and capacity of the lithium-sulfur battery may be increased. Further, when the pores of the cathode coating layer have an average diameter of 10 μm or less, lithium ions easily move towards the cathode during the charge of the lithium-sulfur battery, thereby reducing the charging time.

The cathode coating layer may have a porosity of 50 to 95% based on the total volume of the cathode for a lithium-sulfur battery. More specifically, the cathode coating layer may have a porosity of 70 to 95% based on the total volume of the cathode for a lithium-sulfur battery.

In an exemplary embodiment of the present specification, the cathode coating layer has a thickness of 10 nm to 1 μm.

In an exemplary embodiment of the present application, the cathode coating layer is disposed over the entire surface of the surface of the cathode active part.

In an exemplary embodiment of the present application, the form of the cathode for a lithium-sulfur battery is a plate type or a rod type.

When the form of the cathode for a lithium-sulfur battery is a plate type, it is preferred that the cathode coating layer is disposed at one portion of the surface of the cathode active part, which is exposed to the electrolyte.

When the form of the cathode for a lithium-sulfur battery is a rod type, it is preferred that the cathode coating layer is disposed over the entire portion of the surface of the cathode active part.

In an exemplary embodiment of the present application, the content of the amphiphilic polymer of the cathode coating layer is 0.01 to 10 parts by weight based on 100 parts by weight of the sulfur-carbon composite of the cathode active part.

In an exemplary embodiment of the present application, the cathode active part may further include one or more additives selected from a transition metal element, a Group IIIA element, a Group IVA element, a sulfur compound of these elements, and an alloy of these elements and sulfur.

Examples of the transition metal element include Sc, Ti, V, Cr, Mn, Fe, Co, Ni, Cu, Zn, Y, Zr, Nb, Mo, Tc, Ru, Rh, Pd, Os, Ir, Pt, Au, Hg, and the like, examples of the Group IIIA element include Al, Ga, In, Ti, and the like, and examples of the Group IVA element include Ge, Sn, Pb, and the like, but the examples are not limited thereto.

The cathode active part may further include a cathode active material, or optionally along with an additive, an electrically conducting conductive material for facilitating the movement of electrons in the cathode, and a binder for attaching the cathode active material to a current collector well.

The conductive material is not particularly limited, but a conducting material, such as a graphite-based material such as KS6 and a carbon-based material such as Super-P, Denka black and carbon black, or a conducting polymer, such as polyaniline, polythiophene, polyacetylene, and polypyrrole, may be used either alone or in mixture.

As the binder, it is possible to use poly(vinyl acetate), polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride, a copolymer (trade name: Kynar) of polyhexafluoropropylene and polyvinylidene fluoride, poly (ethyl acrylate), polytetrafluoro ethylene, polyvinyl chloride, polyacrylonitrile, polyvinylpyridine, polystyrene, derivatives, blends, and copolymers thereof, and the like.

For the content of the binder, the binder may be added in an amount of 0.5 to 30 wt %, based on the total weight of the mixture including the cathode active material. When the content of the binder is less than 0.5 wt %, physical properties of the cathode deteriorate, and thus, there is a problem in that an active material and a conductive material in the cathode are eliminated, and when the content is more than 30 wt %, the ratio of the active material and the conductive material in the cathode is relatively decreased, and thus, the battery capacity may be decreased, which is not preferred.

The present application provides a lithium-sulfur battery including the above-described cathode for a lithium-sulfur battery.

A separator disposed between the cathode and the anode separates or insulates the cathode and the anode from each other and is able to transport lithium ions between the cathode and the anode, and may be composed of a porous non-conducting or insulating material. The separator may be an independent member such as a film, and may also be a coating layer which is added to the cathode and/or the anode.

Examples of a material constituting the separator include polyolefins such as polyethylene and polypropylene, a glass fiber filter paper, and a ceramic material, but are not limited thereto, and the thickness thereof may be about 5 μm to 50 μm, specifically about 5 μm to about 25 μm.

In an exemplary embodiment of the present application, the lithium salt is one or more selected from the group consisting of LiSCN, LiBr, LiI, $LiPF_6$, $LiBF_4$, $LiSO_3CF_3$, $LiClO_4$, $LiSO_3CH_3$, $LiB(Ph)_4$, $LiC(SO_2CF_3)_3$, and $LiN(SO_2CF_3)_2$.

The concentration of the lithium salt may be about 0.2 M to 2.0 M depending on various factors, such as an exact composition of an electrolyte solvent mixture, the solubility of a salt, the conductivity of the dissolved salt, charge and discharge conditions of a battery, the working temperature, and other factors publicly known in the field of the lithium battery. Examples of the lithium salt for being used in the present application may include one or more from the group consisting of LiSCN, LiBr, LiI, $LiPF_6$, $LiBF_4$, $LiSO_3CF_3$, $LiClO_4$, $LiSO_3CH_3$, $LiB(Ph)_4$, $LiC(SO_2CF_3)_3$, and $LiN(SO_2CF_3)_2$.

In an exemplary embodiment of the present application, the lithium alloy as the anode active material is an alloy of lithium and a metal selected from the group consisting of Na, K, Rb, Cs, Fr, Be, Mg, Ca, Sr, Ba, Ra, Al, and Sn.

In an exemplary embodiment of the present application, the organic solvent is a single solvent or a mixed organic solvent of two or more solvents.

When the mixed organic solvent of two or more solvents is used, it is preferred to select and use one or more solvent from two or more groups of a weak polar solvent group, a strong polar solvent group, and a lithium metal protection solvent group.

The weak polar solvent is defined as a solvent having a dielectric constant less than 15, which is capable of dissolving the sulfur element in an aryl compound, bicyclic ether, and a non-cyclic carbonate, the strong polar solvent is defined as a solvent having a dielectric constant more than 15, which is capable of dissolving lithium polysulfide in bicyclic carbonate, a sulfoxide compound, a lactone compound, a ketone compound, an ester compound, a sulfate compound, and a sulfite compound, and the lithium metal protection solvent is defined as a solvent having charge-discharge cycle efficiency of 50% or more, which forms a solid electrolyte interface (SEI) which is stable against lithium metal, such as a saturated ether compound, an unsaturated ether compound, and a heterocyclic compound including N, O, S, or a combination thereof.

Specific examples of the weak polar solvent include xylene, dimethoxyethane, 2-methyl tetrahydrofuran, diethyl carbonate, dimethyl carbonate, toluene, dimethyl ether, diethyl ether, diglyme, tetraglyme, and the like.

Specific examples of the strong polar solvent include hexamethyl phosphoric triamide, γ-butyrolactone, acetonitrile, ethylene carbonate, propylene carbonate, N-methylpyrrolidone, 3-methyl-2-oxazolidone, dimethylformamide, sulfolane, dimethyl acetamide, dimethyl sulfoxide, dimethyl sulfate, ethylene glycol diacetate, dimethyl sulfite, or ethylene glycol sulfite, and the like.

Specific examples of the lithium protection solvent include tetrahydrofuran, ethylene oxide, dioxolane, 3,5-dimethyl isoxazole, furan, 2-methyl furan, 1,4-oxane, 4-methyl dioxolane, and the like.

The present application provides a battery module including the lithium-sulfur battery as a unit cell.

The battery module may be specifically used as a power source for an electric vehicle, a hybrid electric vehicle, a plug-in hybrid electric vehicle, or a power storage device.

Further, a method of preparing the cathode for a lithium-sulfur battery according to an exemplary embodiment of the present application includes: forming a cathode active part including a sulfur-carbon composite; and forming a cathode coating layer, which includes an amphiphilic polymer including a hydrophilic portion and a hydrophobic portion, on at least one portion of a surface of the cathode active part.

According to an exemplary embodiment of the present application, the forming of the cathode active part may utilize a ball mill process or a melt-mixing process.

According to an exemplary embodiment of the present application, the forming of the cathode coating layer may utilize a composition including an amphiphilic polymer and may utilize dip coating, die coating, comma coating, gravure coating or bar coating methods, but is not limited thereto.

According to an exemplary embodiment of the present application, the content of the amphiphilic polymer may be 0.01 to 10 parts by weight based on 100 parts by weight of the sulfur-carbon composite.

According to an exemplary embodiment of the present application, the composition including the amphiphilic polymer may additionally include a solvent, and the content of the amphiphilic polymer may be 1 to 30 wt % based on the total weight of the composition.

Hereinafter, the present application will be described with reference to the Examples of the present application, but the following Examples are provided for exemplifying the present application, and the scope of the present application is not limited thereto.

EXAMPLES

Example 1

A conductive carbon having electric conductivity and sulfur were mixed at a ratio of 30:70 wt %, and a sulfur-carbon composite was prepared through a ball mill process.

A cathode slurry was prepared by adding a composition, which includes 70.0 wt % of a cathode active material including the sulfur-carbon composite, 20.0 wt % of Super-P (conductive material), and 10.0 wt % of PVDF (binder), to a solvent N-methyl-2-pyrrolidone (NMP), and then a cathode was prepared by coating the cathode slurry on an aluminum current collector.

An aqueous polyvinyl pyrrolidone (PVP) solution dissolved in an amount of 5 wt % in DI water was used and overcoated on the cathode.

A lithium-sulfur battery was prepared by using a lithium foil having a thickness of about 150 μm as an anode and a mixed electrolytic solution of dimethoxyethane in which 1 M of $LiN(CF_3SO_2)_2$ was dissolved and dioxolane (5:5 by volume) as an electrolytic solution, and using 16 micron polyolefin as a separator.

Comparative Example 1

The present example was performed in the same manner as in Example 1, except that in Example 1, 5 wt % of polyvinyl pyrrolidone (PVP) was added to the cathode slurry instead of a process of overcoating the aqueous polyvinyl pyrrolidone (PVP) solution on the cathode.

Comparative Example 2

The present example was performed in the same manner as in Example 1, except that in Example 1, the aqueous polyvinyl pyrrolidone (PVP) solution was overcoated on the cathode.

Experimental Example

For the lithium-sulfur batteries prepared in Example 1 and Comparative Examples 1 and 2, a change in charge and discharge characteristics was tested by using a charge and discharge measurement device. For the obtained batteries, the initial discharge capacities and discharge capacities for each cycle were measured by repeating each of 50 cycles of the charge and discharge at 0.1 C/0.1 C charge/discharge, 0.2 C/0.2 C charge/discharge, and 0.5 C/0.5 C charge/discharge, and the results are shown in the following Tables 1 and 2 and FIGS. 2 and 3. More specifically, the following FIG. 2 is a view illustrating the initial charge capacities of the lithium-sulfur batteries in Example 1 and Comparative Examples 1 and 2, and the following FIG. 3 is a view illustrating the discharge capacities of the lithium-sulfur batteries for each cycle in Example 1 and Comparative Examples 1 and 2.

TABLE 1

| | 0.1 C | | 0.2 C | | 0.3 C | |
|---|---|---|---|---|---|---|
| | Initial capacity (mAh/g) | Capacity % compared to 0.1 C capacity | Initial capacity (mAh/g) | Capacity % compared to 0.1 C capacity | Initial capacity (mAh/g) | Capacity % compared to 0.1 C capacity |
| Example 1 | 1,080 | 100 | 970 | 90 | 935 | 87 |
| Comparative Example 1 | 1,050 | 100 | 900 | 86 | 880 | 76 |
| Comparative Example 2 | 1,100 | 100 | 990 | 90 | 800 | 88 |

TABLE 2

| | Capacity maintenance ratio (%) after 50 cycles |
|---|---|
| Example 1 | 87 |
| Comparative Example 1 | 86 |
| Comparative Example 2 | 75 |

As in the results, according to the present application, by providing an outer coating layer, which includes an amphiphilic polymer including a hydrophilic portion and a hydrophobic portion, on at least one portion of a surface of a cathode active part including a sulfur-carbon composite, the amphiphilic polymer may be bonded to lithium polysulfide produced during the discharge, and accordingly, may suppress a phenomenon in which lithium polysulfide is dissolved into the electrolytic solution, thereby improving cycle characteristics of a lithium-sulfur battery.

The invention claimed is:

1. A method of preparing a cathode for a lithium-sulfur battery, the method comprising:
    forming a cathode active part comprising a sulfur-carbon composite; and
    forming a cathode coating layer, which comprises an amphiphilic polymer comprising a hydrophilic portion and a hydrophobic portion, on at least one portion of a surface of the cathode active part,
    wherein the cathode coating layer consists of an amphiphilic polymer comprising polyvinyl pyrrolidone (PVP),
    wherein the cathode coating layer comprises pores and the pores have an average diameter of 1 nm to 10 μm,
    wherein the cathode coating layer has a porosity of 50 to 95% based on a total volume of the cathode coating layer, and
    wherein the cathode coating layer has a thickness of 10 nm to 1 μm.

2. The method of claim 1, wherein the forming of the cathode coating layer utilizes a composition comprising the amphiphilic polymer, and utilizes dip coating, die coating, comma coating, gravure coating or bar coating methods.

3. The method of claim 2, wherein the composition comprising the amphiphilic polymer additionally comprises a solvent, and a content of the amphiphilic polymer is 1 to 30 wt % based on a total weight of the composition.

\* \* \* \* \*